United States Patent [19]

Manning

[11] Patent Number: 4,710,920
[45] Date of Patent: Dec. 1, 1987

[54] BIT INTERLEAVED MULTIPLEXER SYSTEM PROVIDING BYTE SYNCHRONIZATION FOR COMMUNICATING APPARATUSES

[75] Inventor: David J. Manning, Waterbury, Conn.

[73] Assignee: General DataComm, Inc., Middlebury, Conn.

[21] Appl. No.: 876,229

[22] Filed: Jun. 19, 1986

[51] Int. Cl.$^4$ ............................................. H04J 3/06
[52] U.S. Cl. ..................................... 370/100; 370/112
[58] Field of Search ............... 370/100, 103, 105, 112, 370/118

[56] References Cited

U.S. PATENT DOCUMENTS

| Re. 29,215 | 5/1977 | Carney et al. | 370/112 |
| 4,394,757 | 7/1983 | Muzumdan et al. | 370/100 |
| 4,494,232 | 1/1985 | Pambrackas | 370/118 |

*Primary Examiner*—Salvatore Cangialosi
*Attorney, Agent, or Firm*—David P. Gordon

[57] ABSTRACT

A bit interleaved multiplexer system permitting byte synchronization of apparatuses communicating thereon without the consumption of additional aggregate bandwidth is provided. The system comprises a multiplexer, a demultiplexer, and an aggregate line. The multiplexer includes a transmit frame which includes a memory means and at least one recirculating counter which is programmed according to a framing algorithm, and a transmit data buffer and transmit mark buffer for each terminal which is to be connected to the system. Every time the transmit frame requests a predetermined bit of a byte (e.g. an MSB), a "1" is marked in the mark buffer. When a bit leaves the mark buffer it causes the terminal to write a bit into the transmit data buffer, with the written bit being an MSB when the bit leaving the mark buffer is a "1". By arranging the delay through the transmit mark and data buffers to be equal to I(L)+C, where I is an integer greater than zero, L is the length of a byte, and C is a constant phase shift, when the transmit frame requests an MSB, an MSB will be sent by the transmit data buffer C requests later. If C is set to zero, an MSB will be sent when the transmit frame so requests. The demultiplexer of the invention includes a receive frame which is synchronized with the transmit frame and which includes a memory means and at least one recirculating counter, and a receive data buffer and receive mark buffer for each terminal which is connected to the system. Every time the framing algorithm indicates that an MSB is being received by the receive frame, a "1" is marked into the receive mark buffer while the bit is forwarded to the receive data buffer. Because the receive mark and receive data buffers are equal in length, the terminal receiving information from the buffers will be provided with the information as to whether the received bit is an MSB.

22 Claims, 2 Drawing Figures

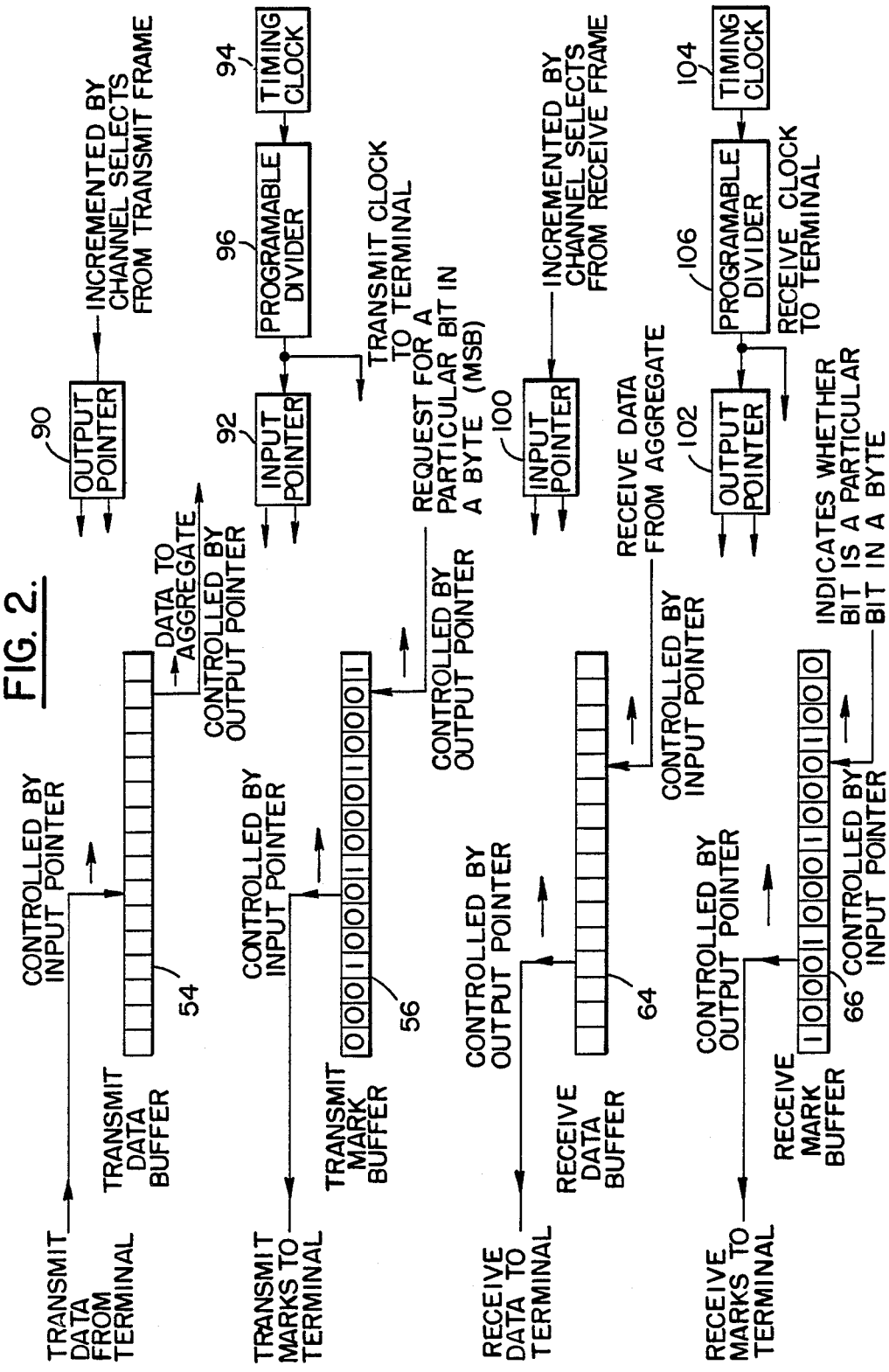

BIT INTERLEAVED MULTIPLEXER SYSTEM PROVIDING BYTE SYNCHRONIZATION FOR COMMUNICATING APPARATUSES

BACKGROUND

This application is related to concurrently filed application Ser. No. (876,232) entitled "Variable Control and Data Rates in Highly Efficient Multiplexer", which is hereby incorporated by reference herein and which is assigned to the assignee herein.

The present invention relates to time-division-multiplex (TDM) telecommunication systems which permit byte synchronization of apparatuses when bit interleaving of information is performed by the TDM system. More particularly, the present invention relates to systems for permitting byte synchronization for bit interleaved multiplexed information without consuming aggregate bandwidth beyond what is required for multiplexer framing synchronization.

In conventional bit interleaved TDM systems, where it is desired to transmit information, a transmit frame of the multiplexer comprises a memory means and a recirculating counter. The recirculating counter incrementally calls various addresses in the memory means. The memory means is programmed according to a framing algorithm to indicate which channel is to be polled for its information. When a channel is polled, it outputs a bit of information. Thus, binary information from different incoming channels are interleaved bit by bit by the multiplexer according to a framing algorithm for transmission. The multiplexed information is received at a receiving terminal where it is demultiplexed by a (de)-multiplexer which has the framing algorithm information and which is synchronized with the transmitting multiplexer. In this manner, the stream of bits which was multiplexed together from a plurality of channels is divided into its composite parts and properly received by the terminals which are connected to the various channels. The multiplexed information typically includes data, control information, synchronizing information and intermultiplexer communication information.

Conventional TDM systems also include data buffers or elastic stores which are used to accommodate variances in the rate at which selects are sent to channels from the transmit and receive frames. The buffers absorb short-term variances in the rates at which data is selected by the frames and the rates at which data is sent to or taken from a terminal.

Because data and information are typically coded as bytes of information, it is desirable in TDM telecommunication systems for the receiving terminal to be aware of the location of the most significant bits (MSB's) of the received information. However, because the bytes are being sent bit by bit, the identification of the MSB's is not readily available. Some systems have overcome this problem by tagging the MSB (e.g. sending control or additional synchronizing information to accompany the MSB) so that it will be recognized by the receiving terminal. Other systems have sent additional address bits to indicate the start of each byte. While such schemes do overcome the problem, they have the unwanted effect of consuming valuable bandwidth thereby reducing data throughput. Clearly then, it would be advantageous to be able to locate the MSBs without using additional bandwidth.

SUMMARY OF THE INVENTION

It is therefore an object of the invention to provide systems for identifying the most significant bit of a byte of information which has been transmitted via a bit interleaved multiplexer without consuming additional bandwidth.

It is a further object of the invention to provide a system for the byte synchronization of apparatuses communicating via bit interleaved multiplexers by using synchronization overhead required for the frame synchronization of the multiplexers.

The invention for providing byte synchronization between a plurality of apparatuses where bits of information from the plurality of apparatuses are multiplexed and demultiplexed comprises:

(a) a multiplexer having
  (1) a transmit frame including at least one recirculating counter and a memory means, wherein the recirculating counters address the memory means, and the memory means is programmed according to a framing algorithm which frames at least data and multiplexer framing synchronization information,
  (2) a plurality of transmit data buffers for accumulating bits of information from their respective terminals, wherein a transmit data buffer sends a bit of information for transmission when said transmit frame selects a channel associated with said transmit data buffer according to said framing algorithm, and
  (3) a plurality of transmit mark buffers, wherein when said transmit frame selects a channel, a bit of information is written into the transmit mark buffer for the selected channel, the value of said bit having a first value when a predetermined bit of a byte as defined by said framing algorithm is selected according to said frame, and having a second value when a bit other than said predetermined bit of a byte as defined by said framing algorithm is selected, and wherein when a bit of information exits a transmit mark buffer, the terminal associated therewith sends a bit of information into its respective transmit data buffer, said bit being said predetermined bit of a byte when the exiting bit has said first value;

(b) a demultiplexer having
  (1) a receive frame including at least one recirculating counter and a memory means, wherein said receive frame recirculating counters address the memory means, and the memory means is programmed according to a second framing algorithm which demultiplexes at least data and framing synchronization information received from said multiplexer, wherein said framing synchronization information is used to synchronize said transmit and receive frames of said multiplexer and demultiplexer;
  (2) a plurality of receive data buffers for accumulating bits of information selected by said receive frame and for sending them to their respective terminals; and
  (3) a plurality of receive mark buffers, wherein when a bit of information is written into the receive data buffer for a terminal, an additional bit is written into said receive mark buffer, the value of said additional bit having a first value when said predetermined bit of a byte as defined by said second framing algorithm is indicated by said frame, and having a second value when a bit other than said predetermined bit of a byte as defined by said second framing algorithm is indicated, and wherein when a bit of information exits a receive mark buffer together with a bit exiting a receive data buffer, the terminal associated therewith is informed as whether said bit exiting said receive data buffer is said predetermined bit of a byte according to the value of the bit leaving said receive mark buffer; and (c) an aggregate line connecting said multiplexer and demultiplexer over which at least multiplexed data and framing synchronization information is transmitted, wherein the cumulative delay between the request for a particular bit by said transmit frame and the sending of the requested bit over said aggregate line equals $I(L)+C$ bits, where I is an integer greater than zero, L is the number of bits in a byte, and C is a constant which determines a phase shift between the synchronized transmit and receive frames.

Preferably, in accord with the invention, the multiplexer of the invention has demultiplexing capabilities and the demultiplexer has multiplexing capabilities, thereby permitting a full duplex system. Also, preferably, the phase shift (C) is zero and the cumulative transmit delay is set to a multiple of the number of bits in a byte. Typically, the predetermined bit of the byte chosen for marking is the MSB.

According to the invention, the transmit data buffer and transmit mark buffer have input and output pointers with the input pointer of the transmit mark buffer requesting data from the terminal (i.e. an MSB is requested if the input pointer is pointing to a "1", and a less significant bit being requested if the input pointer is pointing to a "0"), and the input pointer of the transmit data buffer dictating where data coming from the terminal is to be placed in the transmit data buffer. The output pointer of the transmit data buffer points to the location in the transmit data buffer of the bit which is to be sent over the aggregate line when the channel is selected according to the frame, while the output pointer of the transmit mark buffer points to where a "1" or a "0" is to be inserted into the mark buffer upon a select of the channel depending on whether the framing algorithm requires an MSB or a less significant bit.

Further objects and advantages of the invention will be more easily understood upon reference to the detailed description of the invention taken in conjunction with the figures.

BRIEF DESCRIPTION OF THE DRAWINGS

FIG. 2 is a block diagram and flow chart of the pointers and clocking utilized with the multiplexer/demultiplexer system invention shown in FIG. 1.

DETAILED DESCRIPTION OF THE PREFERRED EMBODIMENT

Figure 1:
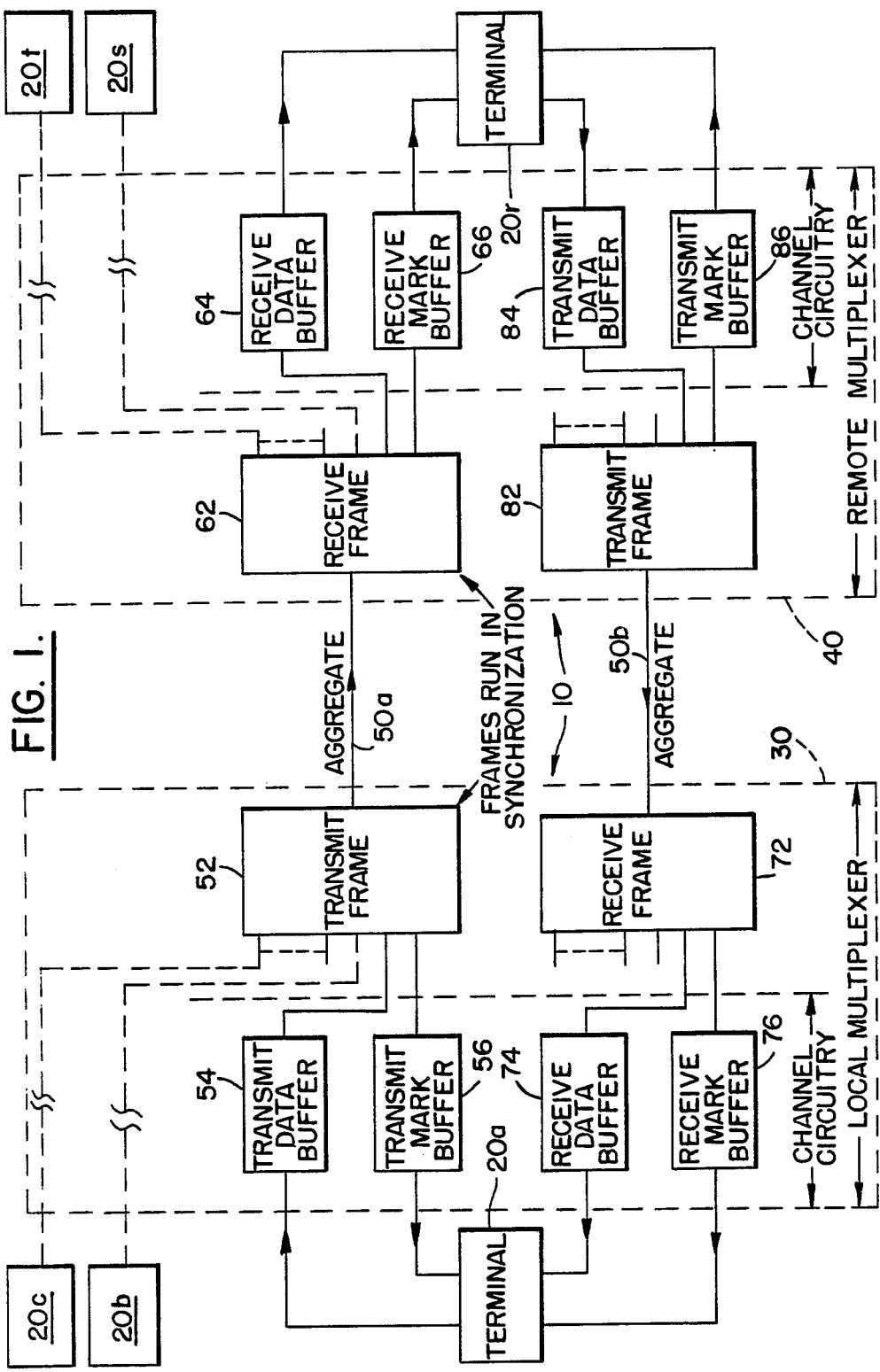
FIG. 1 is a block diagram of the multiplexer/demultiplexer system invention for permitting byte synchronization of bit interleaved information without consuming aggregate bandwidth beyond what is required for multiplexer framing synchronization.

Turning to FIG. 1, the system invention 10 in seen which permits bit multiplexer communication between a plurality of terminals 20a, 20b, 20c, 20d, 20r, 20s . . . wherein byte synchronization is achieved without the consumption of additional aggregate bandwidth. The system basically comprises a multiplexer 30, a demultiplexer 40, and an aggregate line 50a. The multiplexer 30 includes a transmit frame 52 which includes a memory means such as a RAM and at least one recirculating counter which is programmed according to a framing algorithm, and a transmit data buffer 54 and transmit mark buffer 56 for each terminal or apparatus 20a, 20b, 20c . . . which is to be connected to the system. The demultiplexer includes a receive frame 62 which is synchronized with the transmit frame 52 and which includes a RAM and at least one recirculating counter, and a receive data buffer 64 and receive mark buffer 66 for each terminal or apparatus 20r, 20s . . . which is connected to the system. As will be explained more fully hereinafter, to permit full duplex communication, an additional aggregate line 50b is used, and the multiplexer further comprises a receive frame 72 and a plurality of receive data buffers 74 and receive mark buffers 76, while the demultiplexer includes a transmit frame 82 and a plurality of transmit data buffers 84 and transmit mark buffers 86.

As stated above, the transmit frame 52 of multiplexer 30 includes a memory means (RAM) and at least one recirculating counter. The details of the recirculating counters including the clocking are such as is well known in the arts, and the recirculating counters are arranged to address a RAM which is programmed according to a framing algorithm. The preferred framing algorithm for use with the instant invention is that which is disclosed in commonly-owned U.S. Ser. No. 876,232, which is filed concurrently herewith. That invention discloses the use of a framing alogorithm having repeating frames which correlate to data, and a superframe which correlates to control information, synchronization information, and other overhead. However, any framing algorithm which frames at least data and multiplexer framing synchronization information will suffice. Typically, the framing algorithm will also frame control information from the peripheral terminals and from the multiplexers, as well as intermultiplexer communications.

According to the best mode of the invention where up to sixteen peripherals may be connected to the multiplexer 30, each address in the RAM contains eight bits of information. A first bit is used to indicate where in the framing algorithm a first counter is located; i.e. in a frame such that a data bit will be requested, or in the superframe such that a control bit, a synchronization bit, or an intermultiplexer communication or overhead bit will be requested. If the first bit is in a frame and a data bit is to be requested, four additional bits are used to indicate from which channel (peripheral) the next bit of information which is to be sent over the aggregate is to be taken. A sixth bit is used to indicate whether the requested bit is an MSB or not, while a seventh and eighth bit are left undefined. Thus, because of the sixth bit, the first, ninth, seventeenth, . . . occurrence (where eight bit bytes are utilized) of a particular channel in the frame will be marked with a "mark" bit to indicate an MSB.

If the first bit of the eight bits located at the addressed location in the RAM is indicative of the superframe, the remaining seven bits are ignored. Instead, a second recirculating counter (the recirculating superframe counter) is incremented and addresses a different memory location in the RAM which is particular to the superframe. The eight bits of the RAM are then used to determine whether control information is to be sent, or whether a synchronization or communication bit is to be sent. Thus, according to the best mode, if any of the three least significant bits are "0", control information is to be sent. In such a mode, the first four bits provide the address of the channel from which the control information is to be obtained, and the last four bits indicate which control bit is to be transmitted. However, if the three least significant bits are all set to "1", the system is attempting to have intermultiplexer communication or synchronization, and the first five bits have a different meaning. Thus, if the first five bits are "0", it is defined as no operation. If the first bit is set to "1", it indicates the end of a superframe. If the second bit is set to "1", the first or final bit of an intermultiplexer communication byte is indicated. If the fifth bit is set to "1", a communication bit is indicated. Finally, if the fourth and fifth bits are set to "1", a synchronization bit is indicated. It should be appreciated that many different schemes to differentiate between communication, synchronization, and control bits will present themselves to those skilled in the art.

Returning to FIG. 1, the receive frame 62 of the demultiplexer 40 is arranged in a manner similar to the transmit frame 52. Thus, as aforementioned, the receive frame 62 includes a memory means such as a RAM and at least one recirulating counter which addresses the RAM. A first demultiplexing recirculating counter is incremented through the receiving of data bits from the aggregate line 50a and is arranged to address RAM locations. A second demultiplexing recirculating counter is utilized where the RAM indicates that superframe information is being received. In essence, the RAM is programmed according to a framing algorithm such that the data, control, and synchronization information being received by demultiplexer 40 from multiplexer 30 may be demultiplexed and either utilized by receive frame 62, or sent through the proper channels to peipherals 20r, 20s . . . The synchronization information contained in the superframe is used to help synchronize the transmit frame 52 and receive frame 62 and hence the multiplexer 30 and demultiplexer 40. Those skilled in the art will appreciate that the "synchronization" of the transmit and receive frames requires a time offset which accounts for the time it takes for information to be transmitted over a distance traversed by aggregate line 50a. Indeed, if the aggregate "line" includes a satellite, the time offset may be substantial. It will also be recognized that the transmit and receive frames may be synchronized with a phase shift. Thus, while the transmit frame may indicate an MSB at the first mention in the frame of a particular channel, the receive frame may have a phase shift which shifts the expected location of the MSB. Thus, as will be described hereinafter, the receive frame may define as an MSB a frame location which is a given number of selects of a particular channel from the expected location of the MSB.

An understanding of the detailed working of the system invention may best be had by reference to FIG. 2 in conjunction with FIG. 1. When the RAM of transmit frame 52 is accessed, it outputs a "select" to the four bit address it is storing. That address is the address of the channel (i.e. the transmit data buffer 54) from where the next bit of information to be sent over aggregate line 50a is to be obtained. The "select" causes the transmit data buffer 54 to send out over the aggregate line 50a the contents of the location in the buffer to which output pointer 90 is pointing. At the same time, the "select" causes a bit to be written into the transmit mark buffer 56 at the location in mark buffer 56 to which output pointer 90 is pointing. If the bit of information is defined according to the framing algorithm to be a predetermined bit of a byte for which marking is desired (e.g. the MSB), a "1" is written into the transmit mark buffer 56 at the location directed by output pointer 90. If the bit is not the predetermined bit, a "0" is written into the mark buffer 56. After the selected bit has been sent to the aggregate and a bit has been written into the mark buffer 56, the output pointer 90 is updated and points to new locations in the transmit buffer 54 and transmit mark buffer 56. Thus, as will be readily appreciated, particular locations in the transmit data buffer 54 and transmit mark buffer 56 are always addressed simultaneously according to the output pointer 90. It will also be appreciated that while output pointer 90 is illustrated as a single element pointing to two buffers, the pointer could be pointing to different locations in the buffers. Moreover, if desired, two output pointers could be used as long as they are updated together.

While the output pointer 90 is causing information to be read out of transmit data buffer 54, the input pointer 92 is causing information to be inserted into the same data buffer for storage. A high rate clock 94, preferably of about 2 MHz is divided by divider 96 to set the baud rate of the particular channel or peripheral 20. On one edge of the clock cycle, a bit is read out of transmit mark buffer 56 according to the location of pointer 92 and is used to indicate that the peripheral 20 should send a bit of information to the transmit data buffer 54. If pointer 92 is pointing to a bit in mark buffer 56 having the value "1", the peripheral is instructed to send a particular bit of a byte (usually the MSB) to the location in transmit data buffer 54 indicated by the input pointer 92. Otherwise, the peripheral is instructed to send a different bit. The bit is typically sent by the terminal on the other edge of the clock cycle. Is should be appreciated that pursuant to the above-described arrangement, errors of byte synchronization of the peripheral terminal are quickly corrected, as the transmit mark buffer directs the terminal as to whether the bit it is to send is an MSB. If a mark buffer was not utilized, but instead synchronization was initially established and clocking was relied upon to maintain byte synchronization, one error could cause a continual lack of synchronization.

In order for the system for accomplishing byte synchronization for bit interleaved TDM to work, the delay through the transmit end of the system must be kept constantly at I(L)+C bits, where I is an integer greater than zero, L is the number of bits in a byte, and C is the phase shift which is used to relatively set the synchronized frames. Preferably, C is kept at zero. In such a case, to accomplish a delay equal to I(L) bits, the locations of the input and output pointers 92, 90 must be carefully chosen in the mark and transmit data buffers 56, 54. Thus, for example, with eight bit bytes, if the distance between the output pointer and input pointer in the mark buffer is five bits (i.e. it takes five movements of the input pointer until it could catch up to the output pointer), the distance between the input pointer and output pointer in the data transmit buffer would have to be three+IL bits (i.e. it takes three or eleven or nineteen, etc., movements of the output pointer until it could catch up to the input pointer).

If C (the phase shift) is not kept equal to zero, a phase shift must be introduced into the synchronized frames 52 and 62. Thus, instead of expecting MSB's at the first, ninth . . . mention of a channel in the frame as in the transmit frame, the receive frame must be programmed to expect an MSB at the C'th occurrence after the first, ninth... occurrence. Thus, if the cumulative delay through the transmit buffers is eighteen bits and there are eight bits to a byte, C would be set to two. In such a case, the MSB's consistently would be sent over the aggregate two selects after the select which should be an MSB according to the transmit frame. Thus, the receive frame is arranged to compensate for the delay by shifting its MSB expectations by two occurrences.

Because of possible timing variances between the transmit select of the transmit frame 52 which controls the output pointer 90, and the transmit clock 94 which controls the input pointer 92, it is common for the distance between the input and output pointers to vary. It is therefore preferable for both the transmit data and mark buffers to each have a length equal to or greater than the length of a byte. However, with the arrangement as provided, the delay through the system remains the same even when clock variances occur. Thus, the delay through the transmit mark buffer equals:

$$B_m - P_{i,m} + P_{o,m} \quad (1)$$

where the input pointer location is higher than the output pointer location in the mark buffer; and $$P_{o,m} - P_{i,m} \quad (2)$$

where the output pointer location is higher than the input pointer location in the mark buffer; with $B_m$ being the length of the mark buffer, $P_{i,m}$ being the input pointer location in the transmit mark buffer, and $P_{o,m}$ being the output pointer location in the mark buffer.

The delay through the transmit data buffer equals:

$$P_{i,t} - P_{o,t} \quad (3)$$

where the input pointer location is higher than the output pointer location in the data transmit buffer; and $$B_t - P_{o,t} + P_{i,t} \quad (4)$$

where the output pointer location is higher than the input pointer location in the data transmit buffer, with $B_t$ being the length of the transmit data buffer, and $P_{o,t}$ and $P_{i,t}$ respectively being the output pointer and input pointer locations in the data transmit buffer.

The total delay through the transmit buffers comprises the sum of equations (1) or (2) with equations (3) or (4) depending upon the locations of the pointers in the respective buffers. Regardless, it is seen that once the input and output pointers are set to a given delay, the delay always remains constant as equations (1) and (2) subtract the input pointer location and add the output pointer location while equations (3) and (4) add the input pointer location and subtract the output pointer location. Thus, with an extra output select from the transmit frame where the output pointer location would increase by one, a value of one would be added to equations (1) or (2), but the same value would be subtracted in either equation (3) or (4). Likewise, if the transmit clock updated the input pointer 92 without a select having issued from the transmit frame 25, the value of equation (1) or (2) would decrease by one, while the value of equation (3) or (4) would increase by one. The net delay remains unchanged.

The concept of the system providing a constant delay is more easily seen where the length of the mark and transmit data buffers are equal and have a storage capacity equal to the byte length. In such a case $P_{i,t}$ and $P_{m,t}$ are set to be equal as are $P_{o,m}$ and $P_{i,m}$. The addition of equations (1) and (3) reveals that the delay will always equal the buffer length of the mark buffer (all else cancelling out), while the addition of equations (2) and (4) reveals that the delay will always equal the buffer length of the transmit data buffer (all else cancelling out). As the buffer lengths are set equal, the bit delay through the transmit buffers is always equal to the buffer length. Since the buffer bit length in this particular arrangement was set to equal the length of the byte, the bit delay is seen to equal a multiple of the byte length. Thus, no phase shift between the receive and transmit frames is required.

Preferably, according to the invention, the lengths of the transmit data and mark buffers are identically chosen to be twice the length of a byte. Also, preferably the input and output pointers are set in identical positions in both buffers with the input and output pointers being half the length of the buffer (one byte) apart. In this manner the transmit selects coming from transmit frame 52 for updating the output pointer 90 and the transmit clock 94 for updating the input pointer 92 are given almost an entire byte of leeway. If the variance between the clocks is such that the input and output pointers collide, the system resets and the buffers are reinitialized with the data buffer containing all "1's" and the mark buffer containing all "0's".

Turning to the details of the demultiplexing function of the system as seen in FIG. 2, data received from the aggregate 50a is demultiplexed by the receive frame 62. Because the receive frame 62 is synchronized with the transmit frame 52 and is programmed according to a framing algorithm similar to the framing algorithm utilized in transmit frame 52, the receive frame recognizes whether the incoming information is data, control information or intermultiplexer synchronization or communication information, and is able to guide the data and control information into the proper channels. Thus, when control information and data is to be sent to the receive data buffer 64 of the particular channel which is to receive the data or controls, the receive frame generates a "select". The selected receive data buffer 64 receives the incoming data and places it in a register dictated by receive input pointer 100. Simultaneously, the receive frame 62 also generates a mark bit for placement in a register of the receive mark buffer 66 dictated by receive input pointer 100. If, according to the framing algorithm of receive frame 62, the received bit is the predetermined bit of the byte (e.g. MSB), a "1" is written into the receive mark buffer 66. Otherwise, a "0" is written into the buffer at the location dictated by receive input pointer 100. After writing into the receive data and mark buffers, the receive input pointer 100 is incremented.

As with the peripherals of the transmit end, the terminals 20r, 20s . . . on the receive side have a baud rate set by a clock. Clock 104 is a high rate clock which is set at the same 2 MHz rate of clock 94. A divider 106 divides the clock rate to set the baud rate of the particular receiving channel or peripheral 20. When the peripheral is ready to receive a bit of information, the bit is pulled from the receive data buffer at the location dictated by receive output pointer 102. Simultaneously, the peripheral will be informed by receive mark buffer 66 as to whether or not the received bit is the predetermined bit of the byte (MSB), as the output pointer will cause the information in the mark buffer 66 to which it points to be sent to the peripheral. If the bit of information leaving receive mark buffer is a "1", the peripheral is informed that the bit it is receiving from the receive data buffer is an MSB. Likewise, it fht ebit received from the mark buffer is a "0", the peripheral is informed that the bit it is receiving from the receive data buffer is other than an MSB. The length of receive data and mark buffers 64 and 66 is not critical to the invention. However, the buffer lengths must be equal, and are preferably arranged to be at least one byte long so that variance in the clock 104 and the receive frame 62 can be accommodated.

Preferably, in accord with the invention, the multiplexer 30 of the invention has demultiplexing capabilities and the demultiplexer 40 has multiplexing capabilities, thereby permitting a full duplex system when an additional aggregate line 50b is provided. Thus, as is shown in FIG. 1, multiplexer 30 includes a receive frame 72, a receive data buffer 74, and a receive mark buffer 76 all for receiving information, while demultiplexer 40 includes a transmit frame 82, a transmit data buffer 84, and a transmit mark buffer 86 all for sending information. Those skilled in the art will appreciate that the receiving blocks of multiplexer 30 function identically to the demultiplexer 40 as described above, while the sending blocks of demultiplexer 40 function identically to the above-described multiplexer 30.

In operation, the multiplexing system of the invention requires a startup period prior to functioning properly. Typically, the transmit mark buffer will contain a "0" in each of its registers and the data buffer will contain a "1" in each of its registers. In the transmit data buffer 54, the output pointer 90 is defined as trailing the location of the input pointer 92, while in the transmit mark buffer, the input pointer 92 is defined as trailing output pointer 90. In startup for the preferred embodiment where a byte is eight bits, the buffer lengths are equally set to sixteen bits (twice the length of a byte), and the distance between the input pointers and output pointers is preferably set to eight bits (half the length of the buffer). In this manner, variances of up to plus or minus seven bits between the transmit selects and the transmit clock are tolerated. When the transmit frame 52 starts selecting a terminal 20, information begins to be written into transmit mark buffer 56. Because the peripherals will not typically send any information out until they receive a request for an MSB, it will take a number of selects of the channel (equal to the number of bits in a byte—half the buffer length) before information is written into transmit data buffer 54. Additionally, because the output pointer 90 trails the input pointer 92 in the transmit data buffer 54 by the eight bits, it will take eight more select cycles before the first bit of information written into buffer 54 by the peripheral 20 is selected for sending over the aggregate 50a. Indeed, those skilled in the art will appreciate that with this arrangement, a delay equal to the sixteen bit buffer size will occur prior to the sending of information. As this delay is twice the byte size, the system will function properly without a phase shift between the frames.

On the receiving side, an additional delay is added prior to the receipt by a receiving peripheral of the first bit of information sent by the transmitting peripheral. The added delay is caused by the receive data buffer 64 which buffers the information prior to sending it to the receiving peripheral. The delay is equal to the distance between the input and output pointers 100, 102. As with the transmit data and mark buffers 54, 56, the receive data and mark buffers 64, 66 are each sixteen bits in length. However, in both the receive data and mark buffers, the output pointer is arranged to trail the input pointer by eight bits. In this manner, a variance of seven bits between the clock 104 and receive frame 62 is accommodated.

Once the system startup period is finished, the system permits byte synchronization of bit interleaved data without the use of additional overhead beyond what was already required for intermultiplexer synchronization. If the bit delay is a multiple of the byte length, each time in accord with the framing algorithm that the transmit frame 52 requests an MSB from the transmit data buffer 54, the output pointer 92 is pointing to an MSB due to the arrangement of the transmit mark buffer 56 which had previously required an MSB to be sent to the transmit data buffer 54. In fact, where the transmit mark buffer length is a multiple of the byte length, a standing pattern is established in the transmit mark buffer with requests for MSB's ("1") located in particular locations. Likewise, if the transmit data buffer is a multiple of the byte length, a standing pattern is also established therein with an MSB (of either value) located in particular locations. Even if a variance occurs between the transmit clock and the transmit selects of the transmit frame, the delay and the standing patterns are maintained, and the system functions properly.

If the bit delay is not a multiple of the byte length, an MSB will not be sent over the aggregate each time the transmit frame 52 requests an MSB from the data buffer. However, if the total delay through the transmit buffers is kept constant, the MSB will always be a set number of locations away from the bit being sent. The distance away will always be the mathematical remainder which is obtained after dividing the byte length into the bit delay. Thus, this remainder (or phase shift C) indicates that after an additional number (C) of selects of the data buffer by the transmit frame, the MSB will be sent. If, then, the receive frame is arranged to provide for this phase shift by shifting its expectations for MSB's by C occurrences in the frame, the system will function properly.

The systems as above-described not only have the benefit that additional overhead is not required to establish byte synchronization, but they also automatically reestablish byte synchronization where synchronization has been temporarily lost between the terminals 20 and the multiplexer 30. For example, in normal operation a terminal would sequentially output eight bit bytes and the terminal would expect that the MSB requests from the transmit mark buffer would coincide with the beginning of its byte. However, if synchronization is lost, an MSB might be requested from the terminal, for example, after only five less significant bits have been sent. In such a case, while several bytes of information may be lost due to the loss of synchronization, the system will establish synchronization after the patterns in the buffers are reestablished.

There has been described and illustrated herein systems for permitting byte synchronization of bit interleaved multiplexed information without consuming aggregate bandwidth beyond what is required for multiplexer framing synchronization. While particular embodiments of the invention have been described, it is not intended that the invention be limited thereby, as it is intended that the invention be broad in scope and that the specifications be read likewise. Thus, while the invention was described in terms of using eight bit bytes, those skilled in the art will appreciate that the byte length is irrelevant to the novelty of the invention. Also, while the invention was described with input and output pointers for the buffers which are updated by moving along the buffer registers to obtain information, those skilled in the art will recognize that shift register buffers could be utilized instead, provided the clocking is accurate enough such that no variance occurs between the transmit selects and transmit clock. Likewise, while the invention was described as preferably having buffers of equal size with their capacities being at least equal to the byte size, it should be understood that neither buffer capacity nor equal buffer sizes are critical to the invention. Thus, if little variance between transmit selects and the transmit clock is provided, the transmit data and mark buffers together could have a capacity of as few as L+2 bits, where L is the byte length.

Further, while the memory means of the frames was described as being a RAM, other memory means such as, for example, a ROM, or an EPROM may be used. Also, while the invention was primarily described as marking MSB's for byte synchronization, other bits of a byte can be used for byte synchronization.

Finally, it should be appreciated that the terms "terminal", "peripheral", and "apparatuses" were used interchangeably throughout the specification and are intended to encompass a wide range of electrical apparatus which interface with the multiplexer system. Thus, the "peripheral" or "apparatus" might be a modem, a terminal, another multiplexer, a computer, etc. Also, while the aggregate lines were described as being separate, those skilled in the art will appreciate that they may take any of a number of embodiments and such embodiments are not critical to the invention. Therefore, it will be apparent to those skilled in the art that other changes and modifications may be made to the invention as described in the specification without departing from the spirit and scope of the invention as so claimed.

I claim:

1. A bit interleaved multiplexer system which provides byte synchronization for apparatuses communicating on channels therein, comprising:
   (a) a multiplexer having
      (1) a transmit frame including at least one recirculating counter and a memory means, wherein said recirculating counters address the memory means, and the memory means is programmed according to a framing algorithm which frames at least data from said apparatuses and multiplexer framing synchronization information,
      (2) a plurality of transmit data buffers for accumulating bits of information from their respective apparatuses, wherein a transmit data buffer sends a bit of information for transmission when said transmit frame selects a channel associated with said transmit data buffer according to said framing algorithm,
      (3) a plurality of transmit mark buffers, wherein when said transmit frame selects a channel, a bit of information is written into the transmit mark buffer for the selected channel, the value of said bit having a first value when a predetermined bit of a byte as defined by said framing algorithm is selected according to said frame, and having a second value when a bit other than said predetermined bit of a byte as defined by said framing algorithm is selected, and wherein when a bit of information exits a transmit mark buffer, the terminal associated therewith sends a bit of information into its respective transmit data buffer, said bit being said predetermined bit of a byte when the exiting bit has said first value;
   (b) a demultiplexer having
      (1) a receive frame including at least one recirculating counter and a memory means, wherein the recirculating counters address the memory means, and the memory means is programmed according to a second framing algorithm which demultiplexes at least data and framing synchronization information received from said multiplexer, wherein said framing synchronization information is used to synchronize said transmit and receive frames of said multiplexer and demultiplexer,
      (2) a plurality of receive data buffers for accumulating bits of information selected by said receive frame and sending them to their respective apparatuses,
      (3) a plurality of receive mark buffers, wherein when a bit of information is written into the receive data buffer for an apparatus, an addition bit is written into said receive mark buffer, the value of said additional bit having a first value when said predetermined bit of a byte as defined by said second framing algorithm of said demultiplexer is indicated by said receive frame, and having a second value when a bit other than said predetermined bit as defined by receive frame is indicated, and wherein when a bit of information exits a receive mark buffer together with a bit exiting a receive data buffer, the apparatus associated therewith is informed as to whether said bit exiting said receive data buffer is said predetermined bit of the byte according to the value of the bit leaving said receive mark buffer; and
   (c) at least one aggregate line connecting said multiplexer and demultiplexer over which multiplexed data and framing synchronization information is transmitted,
      wherein the cumulative delay between the request of a particular bit by said transmit frame and the sending of the requested bit over said aggregate line equals I(L)+C bits, where I is an integer greater than zero, L is the number of bits in a byte, and C is a constant which determines a phase shift between the synchronized transmit and receive frames.

2. A system according to claim 1, wherein:
said multiplexer further includes a plurality of input pointers and output pointers for pointing to locations in said plurality of transmit data buffers and transmit mark buffers, where the output pointers trail the input pointers in said transmit data buffers, and the input pointers trail the output pointers in said transmit mark buffers.

3. A system according to claim 2, wherein:
C is set to zero, and said synchronized transmit and receive frames have a zero phase shift.

4. A system according to claim 3, wherein:
said transmit mark buffers have bit lengths equalling I(L) where I is an integer greater than zero, and L is the length of a byte.

5. A system according to claim 4, wherein:
said transmit data buffers have bit lengths equalling the lengths of the transmit mark buffers.

6. A system according to claim 5, wherein:
the lengths of said transmit mark buffers and said transmit data buffers equals twice the length of a byte.

7. A system according to claim 6, wherein:
the distance between said input and output pointers along said transmit mark buffers and said transmit data buffers is initially set to equal the length of a byte.

8. A system according to claim 7, wherein:
said demultiplexer further includes a plurality of demultiplexer input and output pointers for said plurality of receive data buffers and receive mark buffers, with the demultiplexing output pointers trailing said demultiplexing input pointers, and the lengths of said receive data buffers and said receive mark buffers are identical.

9. A system according to claim 8, wherein:
the lengths of said receive data buffers equals twice the length of a byte, and the distance between said demultiplexer input and output pointers is initially set to equal the length of a byte.

10. A system according to claim 3, wherein:
said predetermined bit of a byte is the MSB.

11. A system according to claim 10, wherein:
said framing algorithm frames data and control information from said apparatuses, and multiplexer framing synchronization and communication information from said multiplexer.

12. A system according to claim 1, wherein:
said multiplexer further comprises a demultiplexer according to (b);
said demultiplexer further comprises a multiplexer according to (a); and
said at least one aggregate line permits communication between said demultiplexer of said multiplexer and said multiplexer of said demultiplexer,
wherein for each multiplexer, the cumulative delay between the request of a particular bit by said transmit frame and the sending of the requested bit over said aggregate line equals $I(L)+C$ bits, where I is an integer greater than zero, L is the number of bits in a byte, and C is a constant which determines a phase shift between the synchronized transmit frame of the multiplexer and receive frame of its corresponding demultiplexer.

13. A system according to claim 12, wherein:
for each demultiplexer, the multiplexer further includes a plurality of input pointers and output pointers for pointing to locations in said plurality of transmit data buffers and transmit mark buffers, where the output pointers trail the input pointers in said transmit data buffers, and the input pointers trail the output pointers in said transmit mark buffers.

14. A system according to claim 13, wherein:
for each multiplexer and corresponding demultiplexer, C is set to zero, and said synchronized transmit and receive frames have a zero phase shift.

15. A system according to claim 14, wherein:
for each multiplexer, said transmit mark buffers have bit lengths equalling $I(L)$ where I is an integer greater than zero, and L is the length of a byte.

16. A system according to claim 15, wherein:
for each multiplexer, said transmit data buffers have bit lengths equalling the lengths of the transmit mark buffers.

17. A system according to claim 16, wherein:
for each multiplexer, the lengths of said transmit mark buffers and said transmit data buffers equals twice the length of a byte.

18. A system according to claim 17, wherein:
for each multiplexer, the distance between said input and output pointers along said transmit mark buffers and said transmit data buffers is initially set to equal the length of a byte.

19. A system according to claim 18, wherein:
for each demultiplexer, said demultiplexer further includes a plurality of demultiplexer input and output pointers for said plurality of receive data buffers and receive mark buffers, with the demultiplexing output pointers trailing said demultiplexing input pointers, and the lengths of said receive data buffers and said receive mark buffers are identical.

20. A system according to claim 19, wherein:
for each demultiplexer, the lengths of said receive data buffers equals twice the length of a byte, and the distance between said demultiplexer input and output pointers is initially set to equal the length of a byte.

21. A system according to claim 14, wherein
said predetermined bit of a byte is the MSB.

22. A system according to claim 14, wherein:
for each multiplexer, said framing algorithm frames data and control information from said apparatuses, and multiplexer framing synchronization and communication information from said multiplexer.

* * * * *